(12) United States Patent
Shen

(10) Patent No.: US 7,689,385 B2
(45) Date of Patent: Mar. 30, 2010

(54) METHOD OF ANIMATING STRUCTURAL VIBRATION UNDER OPERATIONAL CONDITIONS

(75) Inventor: Lawrence Shen, West Hills, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 136 days.

(21) Appl. No.: 11/926,557

(22) Filed: Oct. 29, 2007

(65) Prior Publication Data

US 2009/0112340 A1   Apr. 30, 2009

(51) Int. Cl.
*G06F 19/00*   (2006.01)

(52) U.S. Cl. .................. 702/190; 702/182; 702/128; 702/183; 702/54; 700/97; 376/259; 73/865.9; 264/40.1

(58) Field of Classification Search ............ 702/34, 702/128, 182, 183, 190; 700/97; 376/259; 73/865.9; 264/40.1
See application file for complete search history.

(56) References Cited

U.S. PATENT DOCUMENTS

| | | | |
|---|---|---|---|
| 4,112,425 A * | 9/1978 | Zobrist et al. ............... 341/110 |
| 4,510,802 A | 4/1985 | Peters | |
| 4,522,062 A | 6/1985 | Peters | |
| 4,676,104 A | 6/1987 | Cullen | |
| 4,682,490 A | 7/1987 | Adelman et al. | |
| 4,744,248 A | 5/1988 | Stewart | |
| 4,913,550 A * | 4/1990 | Montgomery et al. ....... 356/502 |
| 5,069,071 A | 12/1991 | McBrien et al. | |
| 5,239,468 A | 8/1993 | Sewersky et al. | |
| 5,381,692 A | 1/1995 | Winslow et al. | |
| 5,576,972 A * | 11/1996 | Harrison ..................... 702/128 |
| 5,602,757 A | 2/1997 | Haseley et al. | |
| 6,036,162 A | 3/2000 | Hayashi | |
| 6,240,783 B1 * | 6/2001 | McGugin et al. .............. 73/594 |
| 7,228,240 B2 * | 6/2007 | Duron et al. .................. 702/34 |
| 7,286,964 B2 * | 10/2007 | Kim ........................... 702/183 |
| 2005/0125197 A1 * | 6/2005 | Duron et al. ................ 702/182 |
| 2005/0235504 A1 * | 10/2005 | Barvosa-Carter et al. ...... 33/286 |
| 2008/0069290 A1 * | 3/2008 | Park et al. ................... 376/259 |
| 2008/0111264 A1 * | 5/2008 | Esser ........................ 264/40.1 |

* cited by examiner

*Primary Examiner*—Carol S Tsai
(74) *Attorney, Agent, or Firm*—Carlson, Gaskey & Olds

(57) ABSTRACT

A method of analyzing structural vibration according to one aspect of the present invention includes reception of data from a plurality of sensors on a structure, filtration of the data to exclude data outside of a selected frequency band, association of sensor locations with locations on computer model, and generation of an animation which displays the structural vibration.

8 Claims, 4 Drawing Sheets

US 7,689,385 B2

METHOD OF ANIMATING STRUCTURAL VIBRATION UNDER OPERATIONAL CONDITIONS

This invention was made with government support under Contract No.: 5DR2220 with prime contract MDA-SS-96-926C awarded by the Air Force. The government therefore has certain rights in this invention.

BACKGROUND

This invention relates to structural vibration identification, and more particularly to animation of structural vibration under operational conditions.

Dynamic structures, such as that of aerospace vehicles, experience structural vibration. Structural vibration analysis may be utilized to evaluate performance, investigate failures, monitor structural health, and facilitate design. One conventional structural vibration analysis technique is structural animation. Previous structural animation techniques animate a structure at a single frequency by performing a modal extraction from an analysis model, which utilizes no excitation in the model. This, however, will not provide structural vibration information in desired frequency bands under operational conditions.

SUMMARY

A method of analyzing structural vibration according to one aspect of the present invention includes reception of data from a plurality of sensors on a structure, filtration of the data to exclude data outside of a selected frequency band, association of sensor locations with locations on computer model, and generation of an animation which displays the structural vibration.

These and other features of the present invention can be best understood from the following specification and drawings, the following of which is a brief description.

DETAILED DESCRIPTION OF THE PREFERRED EMBODIMENT

Figure 1:
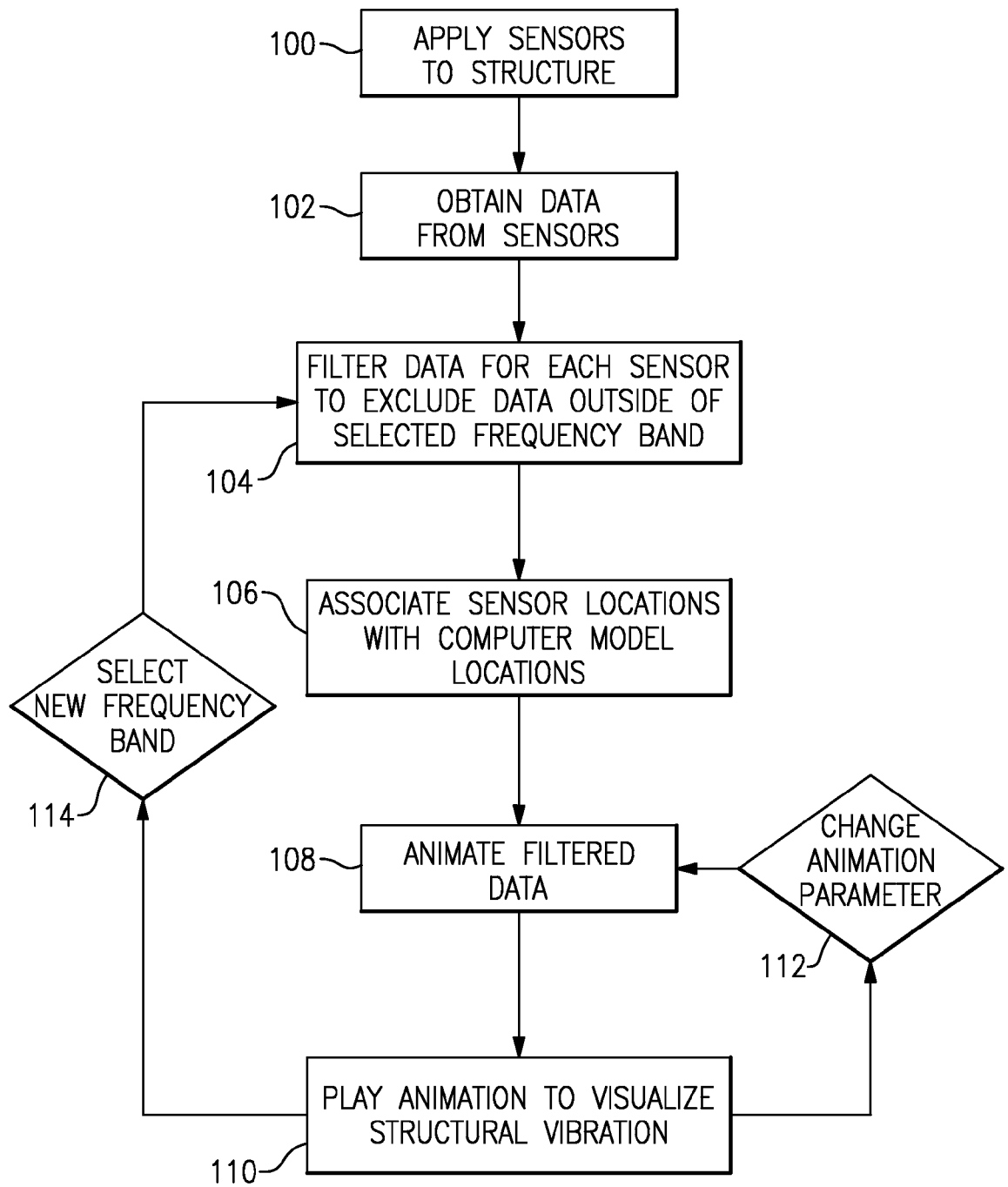
FIG. 1 schematically illustrates in block diagram form an example method of animating structural vibration under operational conditions.
Figure 2:
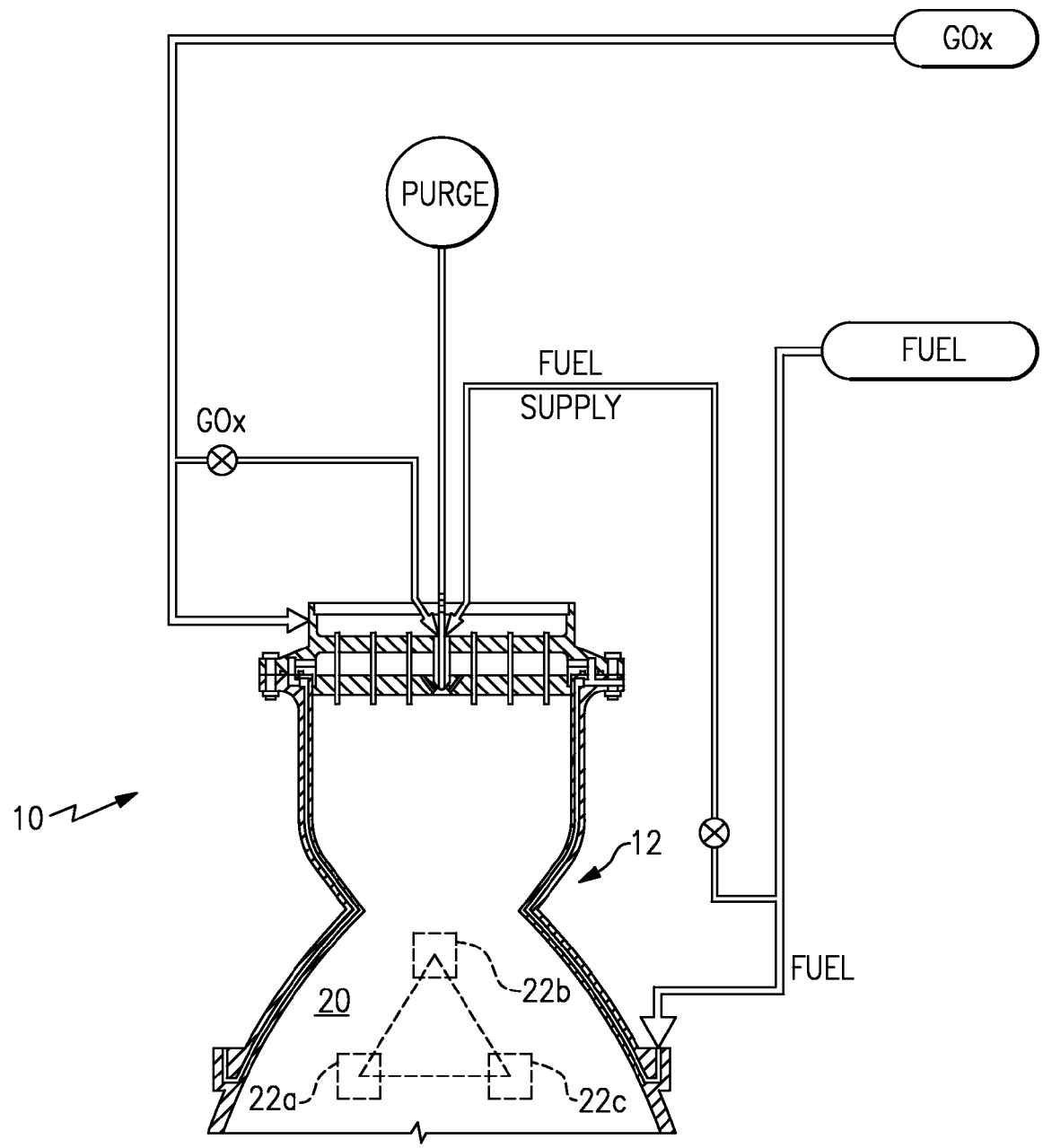
FIG. 2 schematically illustrates a rocket engine combustor system, with the system of the present invention applied thereto.

FIG. 1 schematically illustrates one non-limiting embodiment of a method of animating structural vibration under operational conditions in block diagram form. The method may be utilized with, for example only, a structure, such as an engine system 10 (FIG. 2).

The engine system 10 includes a thrust chamber assembly 12 to which the present invention may be applied in one non-limiting example, through placement of a plurality of sensors 22a-22c (step 100). The sensors 22a-22c may be arranged in a triangular formation (FIG. 2). While one disclosed embodiment illustrates sensors coupled to a nozzle section 20, it is understood that other structures may be so studied and that this invention is not limited to use with rockets or rocket nozzles. Also, while one disclosed embodiment illustrates three sensors 22a-c arranged in a triangular formation, it is understood that other quantities of sensors could be used, and that the sensors could be arranged in other formations.

In one non-limiting embodiment, each sensor 22a-22c is an accelerometer that is operable to record data in three dimensions. Thus, if there are three sensors 22a-22c, the sensors 22a-22c would be operable to provide nine sets of data, corresponding to one set of data for each dimension for each accelerometer. In one example the each of the sensors 22a-c is a triaccelerometer, which is a single accelerometer that is operable to record data in three dimensions.

In another example, each of the sensors 22a-c is an accelerometer assembly that includes three adjacent accelerometers wherein the first accelerometer measures acceleration data along a first axis, the second accelerometer measures acceleration data along a second axis that is perpendicular to the first axis, and the third accelerometer measures acceleration data along a third axis that is perpendicular to the first axis and the second axis.

Once the sensors 22a-c are mounted, data is obtained from the sensors (step 102) by activating the sensors to measure data and applying test conditions to the structure. The application of test conditions may include actual operational conditions, such as operating the engine system 10 (FIG. 2). Each of the plurality of sensors may measure data and transmit the data to a microprocessor. Data received from each of the sensors may be stored in memory. Data from each sensor, or "node," is filtered (step 104) to exclude data corresponding to frequencies outside of a selected frequency band.

Figure 3:
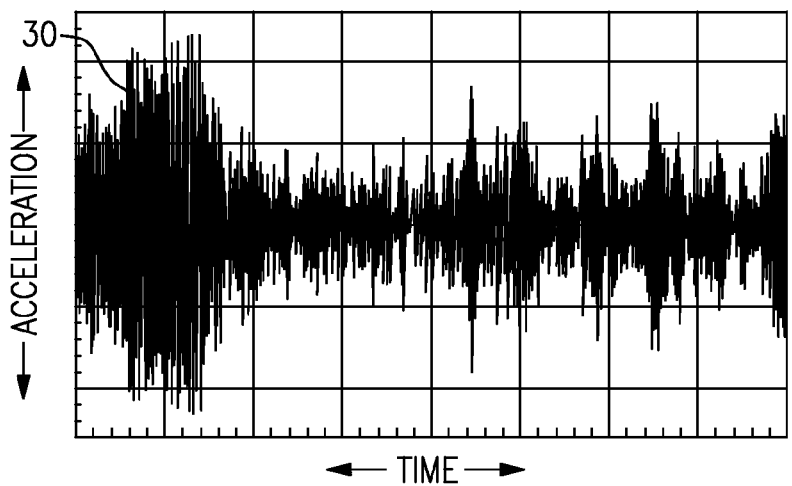
FIG. 3 schematically illustrates example accelerometer data.

Example data, or "time history data," from an accelerometer is illustrated in exemplary form as a magnitude of acceleration 30 varied with time (FIG. 3). In a structural vibration analysis, it is desirable to identify a deformation pattern that a structure will experience. This may include identification of a frequency or frequency band within which a structure experiences a particular shape of vibration. A power spectral density ("PSD") graph illustrates acceleration squared/HZ as a function of frequency (FIG. 4), such that a PSD graph may be utilized to identify a frequency or a frequency band within which a structure experiences a particular deformation pattern of vibration. Accelerometer time history data (FIG. 3) may be converted to a PSD graph using software such as MATLAB.

Figure 4:
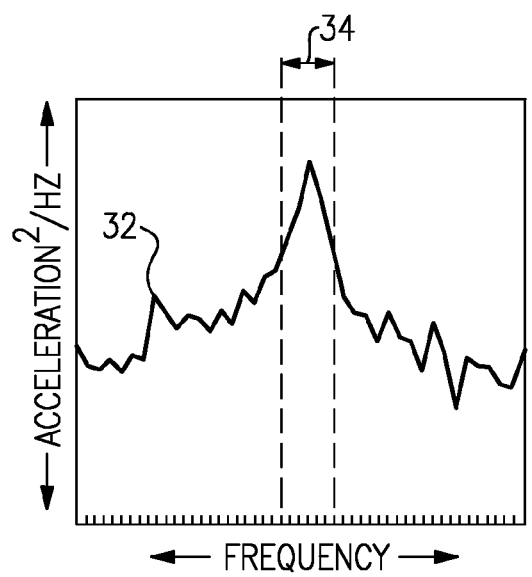
FIG. 4 schematically illustrates an example power spectral density graph of accelerometer data.

A PSD graph of accelerometer data is illustrated in exemplary form as a magnitude of acceleration squared/HZ 32 as a function of frequency (FIG. 4). The value of acceleration squared/HZ 32 is the greatest within a range of frequencies 34, or "frequency band" 34 (FIG. 4). It may therefore be desirable to filter time history data to exclude accelerometer data corresponding to frequencies outside the frequency band 34 to focus on data corresponding to particular structural vibration.

Figure 5:
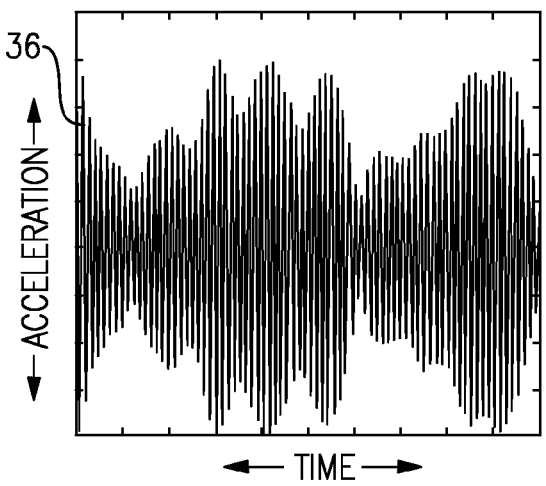
FIG. 5 schematically illustrates example filtered accelerometer data.

Filtered time history data 36 (FIG. 5) may be less densely populated than the example time history data of FIG. 3 because accelerometer data corresponding to frequencies outside of a selected frequency band has been excluded. In one example software, such as MATLAB, may be used to filter time history data to exclude data corresponding to frequencies outside of a selected frequency band. However, it is understood that if no frequency band was selected, a default frequency band could be used to filter the data, or the step of filtering the data (step 104) could be omitted.

The locations of sensors on the structure are associated with locations on a computer model of the structure (step 106). This may include identifying a location of each of the plurality of sensors on the structure. This may also include associating the location of each sensor on the structure with a corresponding location on a computer model of the structure. In one example the computer model includes a finite element model in which the model locations may be stored in memory.

Once the data has been filtered such as in the manner described above, the filtered data is animated (step 108) to illustrate how the structure vibrations under the test conditions. A computer model orientation selection may be received to provide a desired view of the structural vibration. A magnitude of deflection of each of the plurality of sensor locations at a selected time is determined from the filtered data, and an image of the plurality of sensor locations at the selected orientation reflecting the deflection at the selected time is recorded. Each image may also include an undeflected location of each sensor location as a frame of reference. These steps are selectively repeated at plurality of time intervals to obtain a desired quantity of images of the sensor locations. The set of images can then be displayed in succession to provide an animation of the filtered data (step 110). The set of images can also be stored in memory in a video file for future playback. In one example, software such as FEMAP or ANSYS may be used to generate the animation of the filtered data in step 108.

The method of animating structural vibration combines the latest finite element modeling and analysis methods with state of the art data reduction techniques to enable an individual to visualize the vibration of a structure in a selected frequency band under operational conditions. Computer code generates modeling analysis results, and integrates the results with filtered data to generate an animation file which provides all required data for animation in a specific format. The animation file is operable to be input into software with animation capability.

The animation illustrates a deflected shape of a structure. A mode shape is a basic structural dynamic characteristic term, and is not related to excitation. The term 'deflected shape' refers to a specific deformation pattern that may be made up of several mode shapes with different compositions from different modes due to an excitation band consisting of several modes. Animation of a mode shape will illustrate a repeated motion of a deformation pattern from a particular mode, whereas animation of a deflected shape will illustrate a specific type of structural deformation pattern at each instant of time. The pattern of vibration of a deflected shape may change from one instant to another. It is understood that references to animation of filtered data correspond to animation of a deflected shape.

Figure 6A:
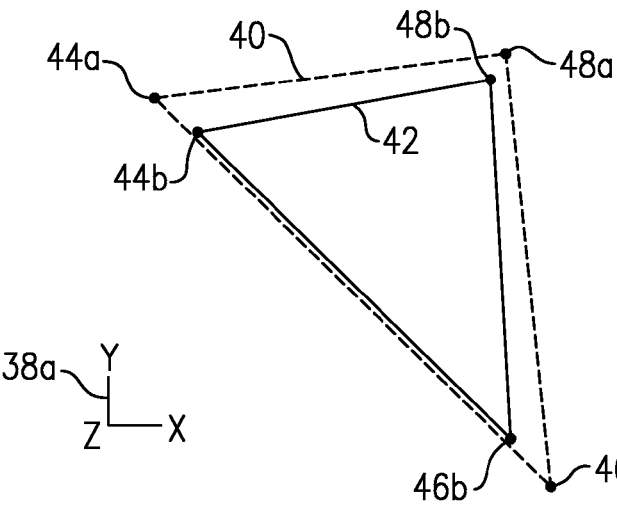
FIG. 6A schematically illustrates an image from an animation of filtered data at an XY orientation.
Figure 6B:
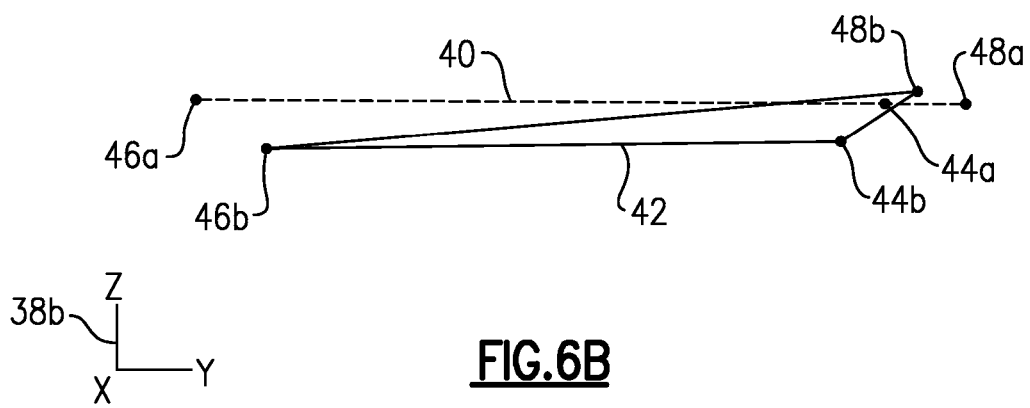
FIG. 6B schematically illustrates an image from an animation of the filtered data of FIG. 6A at a YZ orientation.
Figure 6C:
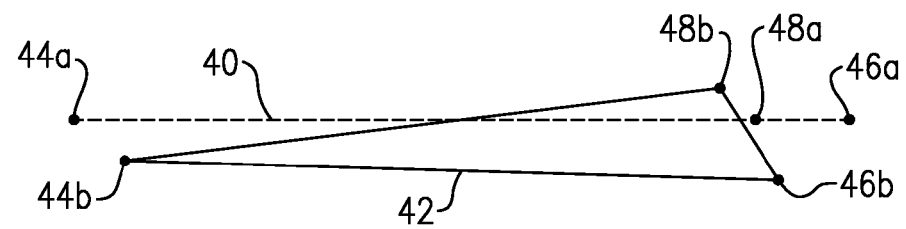
FIG. 6C schematically illustrates an image from an animation of the filtered data of FIG. 6A at an XZ orientation.

FIGS. 6A-C schematically illustrate images corresponding to animations of filtered data at an XY, YZ, and XZ orientations. FIG. 6A displays the sensor locations at an XY orientation, as indicated by a legend 38a. As shown in FIG. 6A, there are three nodes 44, 46, and 48 that correspond to sensor locations. Points 44a, 46a, and 48a and dotted lines 40 correspond to the location of the nodes when not experiencing any deflection or deformation. Points 44b, 46b, and 48b and solid lines 42 indicate the locations of the nodes when experiencing deflection or deformation due to structural vibration. FIG. 6B schematically illustrates the nodes at a YZ orientation as shown in legend 38b. FIG. 6C schematically illustrates the nodes at an XZ structure orientation as shown in legend 38c. However, it is understood FIGS. 6A-C only illustrate example orientations, and that other orientations could be selected.

An animation parameter or a plurality of animation parameters may be changed (step 112) to provide a new animation. Some animation parameters include a structure orientation and a time interval selection corresponding to the interval of time between recorded images. The new animation may then be generated (step 108) in response to the changed animation parameter or parameters. This provides a user with the ability to view and compare different animation from a common set of filtered data. A new frequency band may also be selected (step 114) and then steps 104-110 repeated to filter and animate data for the selected frequency band.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of analyzing structural vibration, comprising:
receiving data from a plurality of sensors on a structure, said receiving comprising:
mounting a first sensor to the structure to measure data along a first axis;
mounting a second sensor to the structure adjacent to the first sensor to measure data along a second axis that is perpendicular to the first axis;
mounting a third sensor to the structure adjacent to the first and second sensors to measure data along a third axis that is perpendicular to the first axis and the second axis;
filtering the data to exclude data outside of a selected frequency band;
associating each sensor location with a location on a computer model of the structure; and
generating an animation of the filtered data.

2. The method as recited in claim 1, wherein said sensors are accelerometers and said data is acceleration data.

3. The method as recited in claim 1, wherein said receiving includes:
repeating said steps of mounting a first sensor, mounting a second sensor, and mounting a third sensor for a plurality of locations.

4. The method as recited in claim 1, further comprising:
applying test conditions to the structure; and
receiving transmissions of data from each of the plurality of sensors.

5. A method of analyzing structural vibration, comprising:
receiving data from a plurality of sensors on a structure;
filtering the data to exclude data outside of a selected frequency band;
associating each sensor location with a location on a computer model of the structure; and
generating an animation of the filtered data, said generating comprising:
receiving a computer model orientation selection;
determining a magnitude of deflection of each of the plurality of sensor locations at a selected time from the filtered data;

recording an image displaying the plurality of sensor locations at the selected orientation reflecting the deflections from said step of determining a magnitude of deflection selectively repeating said steps of determining a magnitude of deflection and recording an image displaying the plurality of sensor locations at a plurality of time intervals to obtain a desired quantity of images; and displaying the recorded images in succession to provide an animation of the filtered data.

6. The method as recited in claim 5, including:
storing the recorded images in memory in a video file.

7. The method of claim 6, wherein the video file is an AVI file.

8. The method as recited in claim 5, wherein at least a portion of the recorded images also display the plurality of sensor locations prior to deflection.

\* \* \* \* \*